US007616154B2

(12) United States Patent
Lee

(10) Patent No.: US 7,616,154 B2
(45) Date of Patent: Nov. 10, 2009

(54) BEAM SWITCHING ANTENNA SYSTEM AND METHOD AND APPARATUS FOR CONTROLLING THE SAME

(75) Inventor: Hyo Jin Lee, Seoul (KR)

(73) Assignee: LG Telecom, Ltd, Seoul (KR)

( * ) Notice: Subject to any disclaimer, the term of this patent is extended or adjusted under 35 U.S.C. 154(b) by 0 days.

(21) Appl. No.: 11/843,424

(22) Filed: Aug. 22, 2007

(65) Prior Publication Data

US 2007/0285313 A1 Dec. 13, 2007

Related U.S. Application Data

(62) Division of application No. 10/787,725, filed on Feb. 25, 2004, now Pat. No. 7,274,330.

(30) Foreign Application Priority Data

Sep. 15, 2003 (KR) ...................... 10-2003-0063788
Sep. 19, 2003 (KR) ...................... 10-2003-0065305
Sep. 19, 2003 (KR) ...................... 10-2003-0065306

(51) Int. Cl.
*H01Q 3/24* (2006.01)
*H01Q 3/44* (2006.01)
*H04B 1/38* (2006.01)

(52) U.S. Cl. ....................................... 342/374; 455/557

(58) Field of Classification Search .................. 455/557
See application file for complete search history.

(56) References Cited

U.S. PATENT DOCUMENTS 5,991,643 A * 11/1999 Chao-Cheng ............ 455/575.7
6,195,570 B1 * 2/2001 Ishida ........................ 455/566
6,515,635 B2 * 2/2003 Chiang et al. ............... 343/834

FOREIGN PATENT DOCUMENTS

EP 1237289 A2 * 9/2002
GB 2327572 A * 1/1999
JP 05327612 A * 12/1993
JP 08-288895 11/1996
JP 2001-036337 2/2001
JP 2003-258522 9/2003

* cited by examiner

*Primary Examiner*—Gregory C Issing
(74) *Attorney, Agent, or Firm*—Sherr & Vaughn, PLLC

(57) ABSTRACT

A method and apparatus for controlling a beam switching antenna system of a mobile communication terminal, the method includes forming a beam; determining whether an earphone is connected to the mobile communication terminal; and controlling the formed beam to have non-directivity if the earphone is connected to the mobile communication terminal. The apparatus for controlling a beam switching antenna includes a signal source for supplying the antenna element with a signal to form the beam; and a controller for controlling the ground switch to apply the reference voltage to the at least one conductive reflector, to thereby imparting the formed beam with a predetermined beam pattern.

8 Claims, 21 Drawing Sheets

BEAM SWITCHING ANTENNA SYSTEM AND METHOD AND APPARATUS FOR CONTROLLING THE SAME

CROSS REFERENCE TO RELATED APPLICATIONS

This application is a divisional of U.S. application Ser. No. 10/787,725, filed Feb. 25, 2004 now U.S. Pat. No. 7,274,330, which claims the benefit of Korean Applications No. 10-2003-0063788 filed on Sep. 15, 2003, No. 10-2003-0065305 filed on Sep. 19, 2003, and No. 10-2003-0065306 filed on Sep. 19, 2003, the contents of which are hereby incorporated by reference.

FIELD OF THE INVENTION

The present invention relates to beam switching antennae, and more particularly, to a beam switching antenna system and a method and apparatus for controlling the same, by which optimal antenna characteristics can be maintained according to a peripheral environment, the necessary time and power consumption of searching an optimal beam-direction can be reduced, and electromagnetic waves of a beam emanating from an antenna toward the user's head can be minimized.

DISCUSSION OF RELATED ART

Antenna configurations include a Yagi-type, parabolic, helical, planar, and the like, with beam patterns which may be classified as directional or omni-directional. A contemporary mobile communication system uses an omni-directional antenna. An omni-directional antenna according to a related art is shown in FIG. 1.

Referring to FIG. 1, an omni-directional antenna includes a monopole element 11, which is a quarter wavelength (λ/4) element perpendicularly disposed with respect to a surface of a conductive reflector 13 having a typically horizontal orientation. The monopole element 11 is connected to a power feed line 12 via a power feed connector (not shown), and the conductive reflector 13 is grounded via a ground line 14 establishing a reference voltage. The monopole element 11 converts radio frequency energy from the power feed line 12 to a transmitting electromagnetic wave (beam pattern) radiating in the atmosphere with a predetermined pattern and converts an electromagnetic wave received from the atmosphere to an electrical signal feeding the power feed line 12. The received signal is the forward link in a mobile communication system, and the transmitted signal is the reverse link.

An inherent characteristic of the above omni-directional antenna is that its beam pattern is non-directional and thus cannot be adapted to a peripheral environment or usage condition, which may call for a directional beam pattern. That is, the transmission energy radiating in a specific direction should in many cases be greater than or less than that radiating in another direction, but the omni-directional antenna of the related art produces a beam pattern in which the transmitted energy levels are roughly equal in all directions, which poses several disadvantages.

For example, the power required to transmit a given distance using an omni-directional antenna is greater than the power required if an antenna transmitting a directional beam were employed. Reverse-link transmission at greater power levels produces a variety of negative effects, including reduced data through rates, increased error rates, and a lowered forward-link communication capacity per cell. In addition, some end users are concerned with electromagnetic waves emanating from an antenna held close to the head, as in the case of a hand-held mobile communication terminal. Accordingly, the use of an omni-directional antenna in such cases inherently causes raised concerns. Moreover, the length of the antenna adopted by a mobile communication terminal, such as a cellular telephone, is desirably short to facilitate miniaturization while maintaining an aesthetically pleasing exterior, and the operating band of the mobile communication terminal is fixed such that the λ/4 length of the omni-directional antenna cannot be shortened. Therefore, the omni-directional antenna of the related art inhibits miniaturization or necessitates an externally mounted antenna.

Meanwhile, an adaptive directional antenna such as that proposed in U.S. Pat. No. 6,100,843 enables the orientation of the beam pattern in a specific direction as desired. The proposed antenna uses a complex configuration of five antenna elements, comprising four antenna elements disposed at the four corners of a square base having a centrally disposed fifth antenna element, and control circuitry including a phase shifter for controlling the phase of a transmission/reception signal of each antenna element using a time-consuming set of operations, during which time a "call disconnect" condition may occur. As such, the adaptive directional antenna is too large, too costly, and too slow and is thus impractical for a mobile communication terminal.

In the operation of the above adaptive directional antenna, an imaginary circle is drawn around the mobile communication terminal and divided into a plurality of angles, and each angle is searched to determine the optimum beam direction. During an idle time, a beam direction is determined for each antenna element through an execution of a loop of operations for each angle for each antenna element. Each loop includes steps of measuring the pilot signal, storing the measurement information, and setting an optimal phase. The imaginary circle may comprise as many as 360 angles, with a greater number imparting greater accuracy but necessitating an even longer time for completing the loop operations. The reverse link power must be boosted throughout the search operation for determining the optimal beam direction, which increases power consumption and produces the same negative effects of an omni-directional antenna.

SUMMARY OF THE INVENTION

Accordingly, the present invention is directed to a beam switching antenna system that substantially obviates one or more of the problems due to limitations and disadvantages of the related art.

An object of the present invention, which has been devised to solve the foregoing problem, lies in providing a beam switching antenna system, by which optimal antenna characteristics are maintained according to a peripheral environment.

It is another object of the present invention to provide a method of controlling a beam switching antenna system and apparatus thereof, by which electromagnetic waves of a beam generated from an antenna are controlled to minimize the radiation exerted on a human body.

It is another object of the present invention to provide a method of controlling a beam switching antenna system and apparatus thereof, by which the necessary time for searching an optimal beam-oriented direction is minimized as well as power consumption thereof is reduced.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages and in accordance with the purpose of the invention, as embodied and broadly described herein, there is provided a beam switching antenna system comprising an antenna element for transmitting and receiving a beam; a dielectric body surrounding said antenna element; at least one conductive reflector facing a lateral outside of said dielectric body; and a ground switch circuit connected to said at least one conductive reflector. The ground switch circuit may include a reference voltage source generating a reference voltage; a ground line connected to the reference voltage source; an electrical switching device connected between the ground line and the at least one conductive reflector; and a controller for controlling the electrical switching device, and the at least one conductive reflector may include an upper conductive reflector having one end connected to one terminal of the electrical switching device; and a lower conductive reflector having one end connected to another terminal of the electrical switching device and the other end connected to the ground line.

In another aspect of the present invention, a method is provided for controlling a beam switching antenna system including an antenna element for forming a beam, at least one conductive reflector for reflecting the beam, and a ground switch for applying a reference voltage to the at least one conductive reflector. The method comprises steps of forming the beam of the antenna element; and imparting the formed beam with a predetermined beam pattern by controlling the ground switch to apply the reference voltage to the at least one conductive reflector. The beam pattern imparting step is performed by selectively closing the ground switch, to thereby impart the desired properties of directivity, width, and gain.

By determining whether an earphone is connected to the mobile communication terminal, the beam may be controlled to have non-directivity if the earphone is connected to the mobile communication terminal. By additionally determining an operation mode of the mobile communication terminal, the beam may be controlled to have directivity in a traffic mode, to have non-directivity in an idle mode, to have directivity if the earphone is disconnected in a traffic mode, and to have non-directivity if the earphone is disconnected in an idle mode.

In another aspect of the present invention, an apparatus is provided for controlling a beam switching antenna system including an antenna element for forming a beam, at least one conductive reflector for reflecting the beam, and a ground switch for applying a reference voltage to the at least one conductive reflector. The apparatus comprises a signal source for supplying the antenna element with a signal to form the beam, and a controller for controlling the ground switch to apply the reference voltage to the at least one conductive reflector, to thereby imparting the formed beam with a predetermined beam pattern. The apparatus may further include an earphone sensing circuit for determining whether an earphone is connected to the mobile communication terminal; and a mode signal generating circuit for determining an operation mode of the mobile communication terminal.

In another aspect of the present invention, a method is provided for controlling a beam switching antenna system including an antenna element for forming a beam, at least one conductive reflector for reflecting the beam, and a ground switch for applying a reference voltage to the least one conductive reflector. The method comprises steps of selectively configuring the beam switching antenna system for a current-directional beam pattern to receive a first signal and for a non-directional beam pattern to receive a second signal; comparing the first and second signals; and controlling, using the ground switch, the beam based on the comparison of the first and second signals.

In another aspect of the present invention, a method is provided for controlling a beam switching antenna system including an antenna element for forming a beam, at least one conductive reflector for reflecting the beam, and a ground switch for applying a reference voltage to the at least one conductive reflector. The method comprises steps of selectively configuring the beam switching antenna system for a non-directional beam pattern to receive a first signal, for a first-directional beam pattern to receive a second signal, and for a second-directional beam pattern to receive a third signal; comparing the received signals; and controlling, using the ground switch, the beam based on the comparison of the received signals.

In another aspect of the present invention, an apparatus is provided for controlling a beam switching antenna system including an antenna element for forming a beam, at least one conductive reflector for reflecting the beam, and a ground switch for applying a reference voltage to the least one conductive reflector. The apparatus comprises a controller for comparing received signals and for controlling, using the ground switch, the beam based on the comparison of the received signals, wherein the beam switching antenna system is selectively configured for a current-directional beam pattern to receive a first signal and for a non-directional beam pattern to receive a second signal.

In another aspect of the present invention, the beam switching antenna system is selectively configured for a non-directional beam pattern to receive a first signal, for a first-directional beam pattern to receive a second signal, and for a second-directional beam pattern to receive a third signal.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Throughout the drawings, like elements are indicated using the same or similar reference designations.

Beam Switching Antenna System

Figure 1:
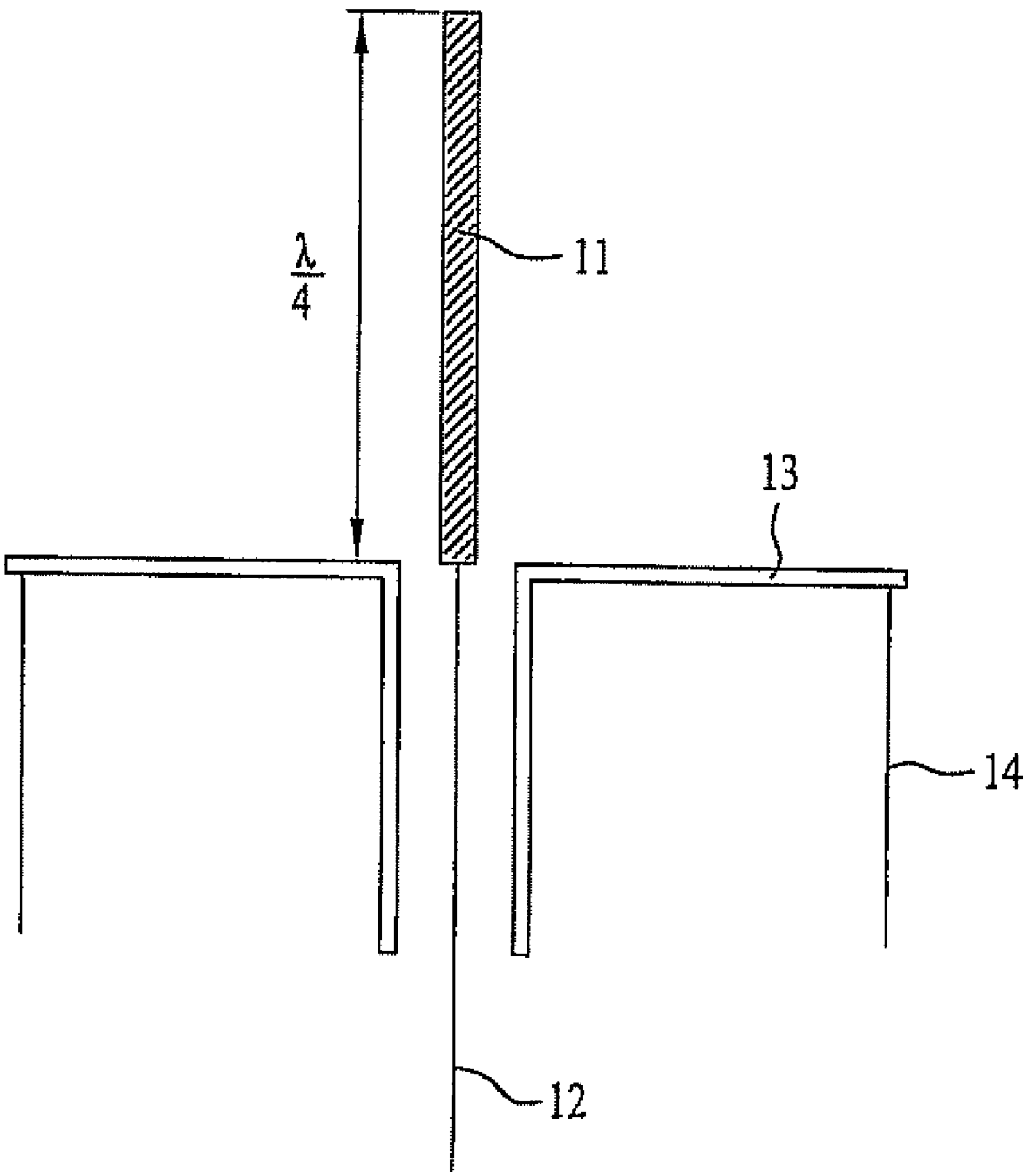
FIG. 1 Related Art
FIG. 1 is a cross-sectional view of an omni-directional antenna according to a related art.
Figure 2:
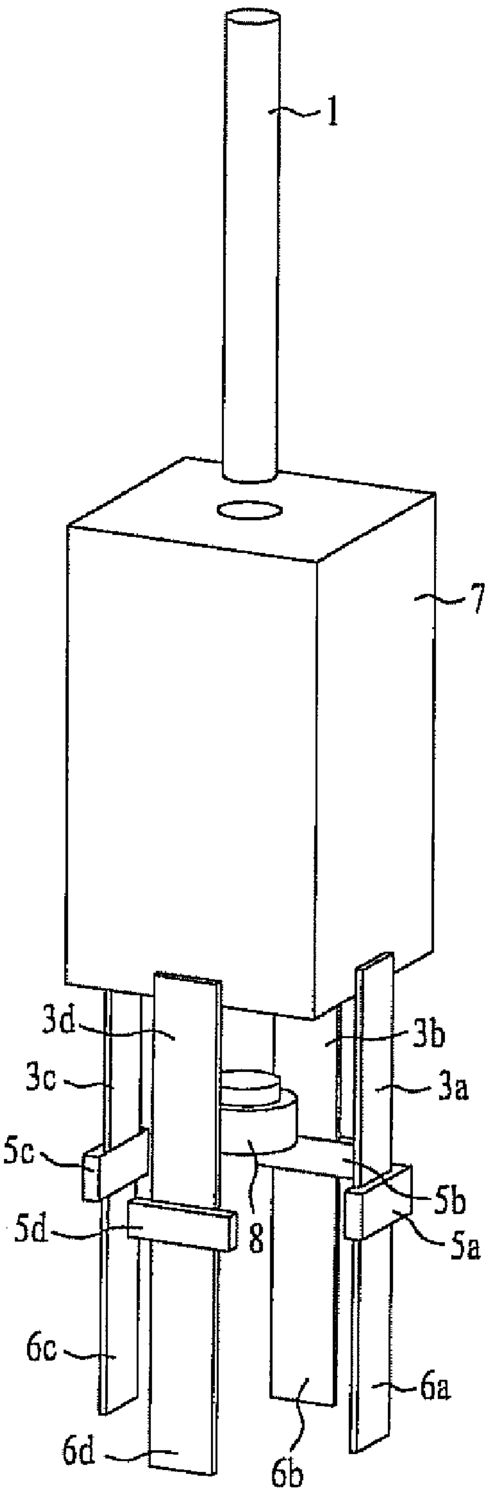
FIG. 2 is an exploded perspective view of a beam switching antenna system according to one embodiment of the present invention.
Figure 3:
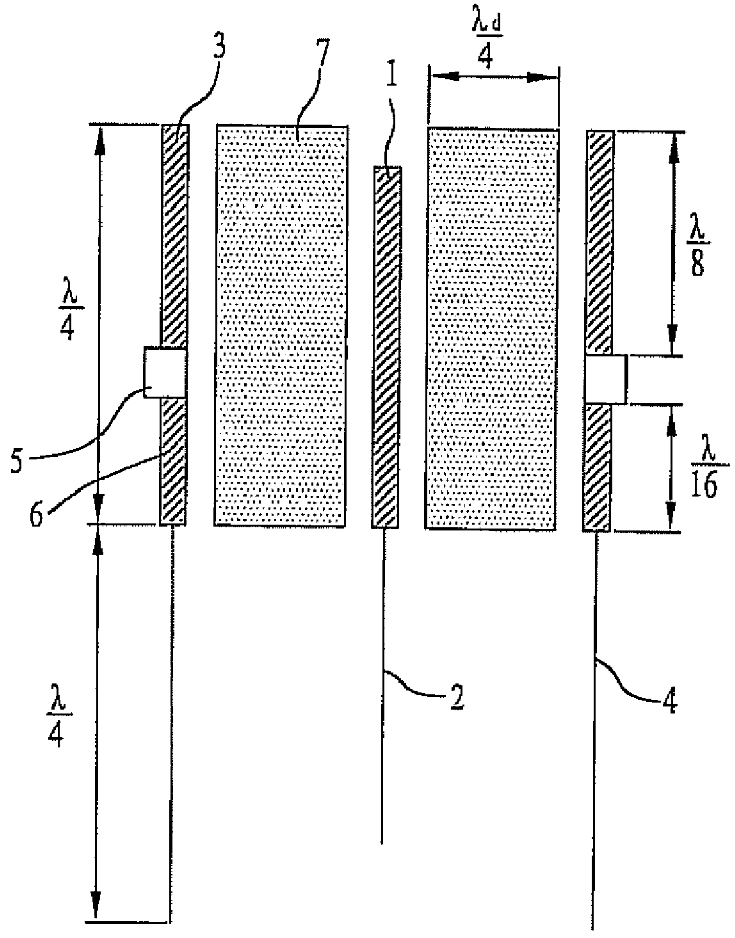
FIG. 3 is a cross-sectional view of a beam antenna switching system shown in FIG. 2.
Figure 4:
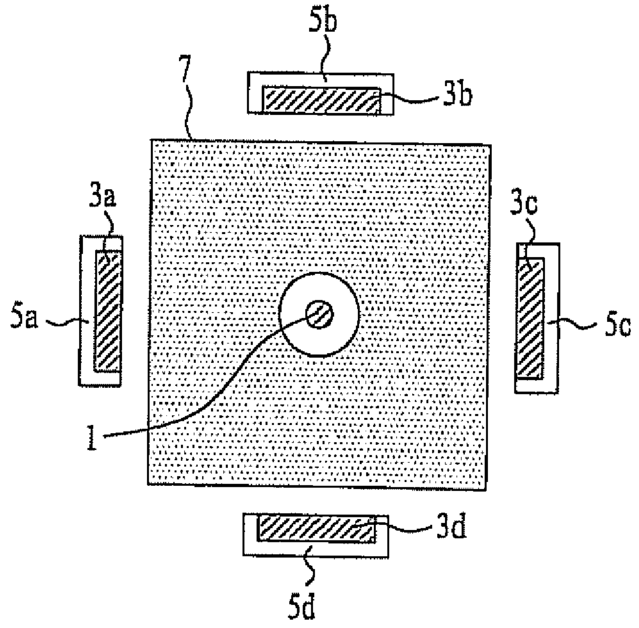
FIG. 4 is a plan view of a beam antenna switching system shown in FIG. 2.
Figure 5A:
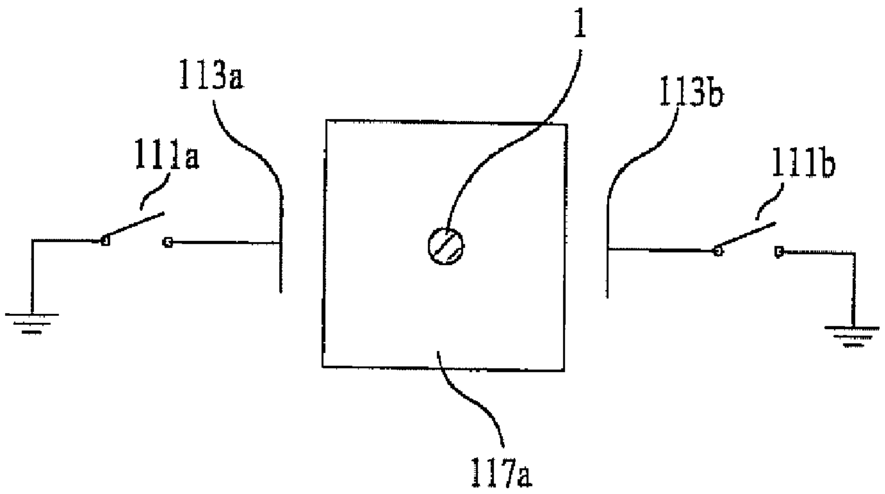
FIGS. 5A to 5E are schematic diagrams of a beam antenna switching system according to other embodiments of the present invention, respectively.
Figure 5B:
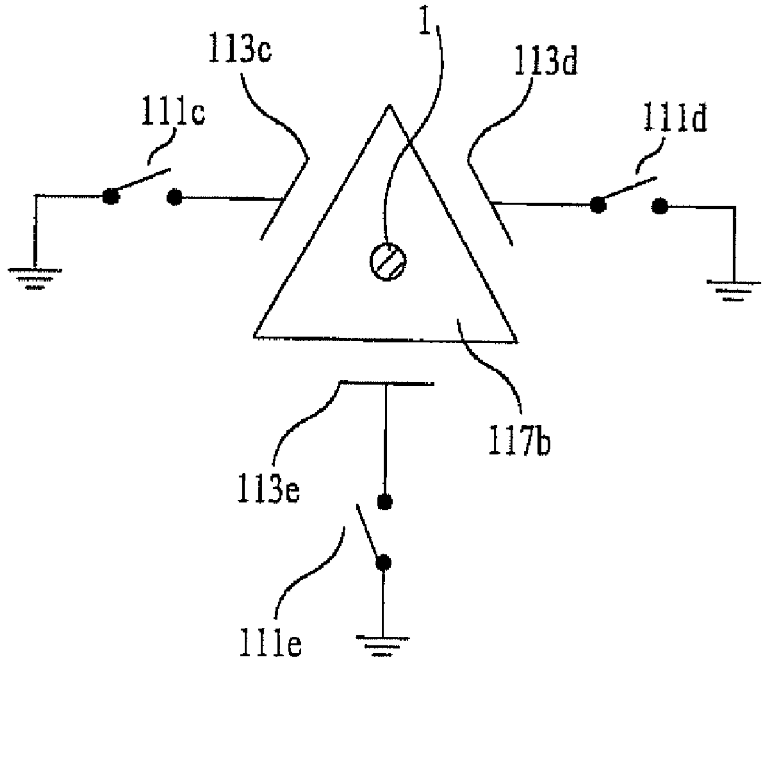
Figure 5C:
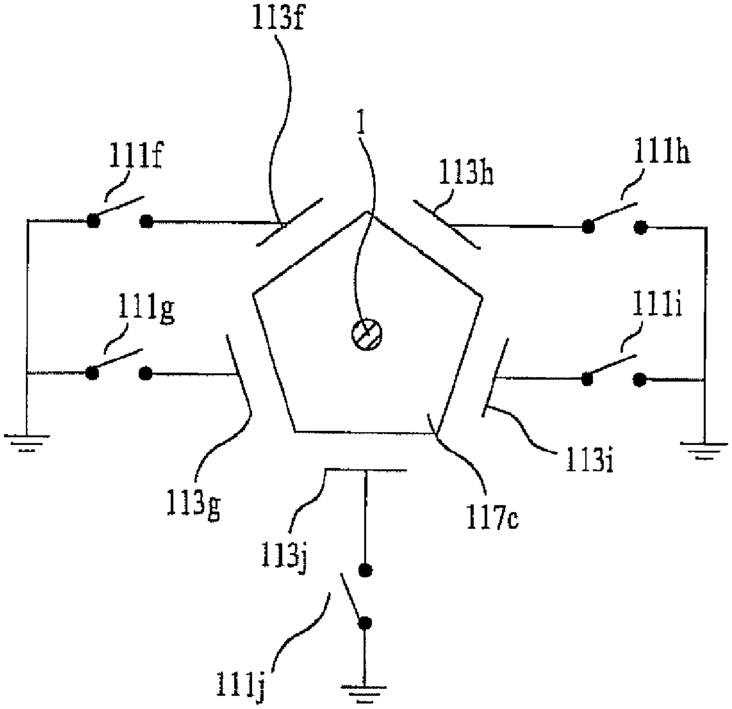
Figure 5D:
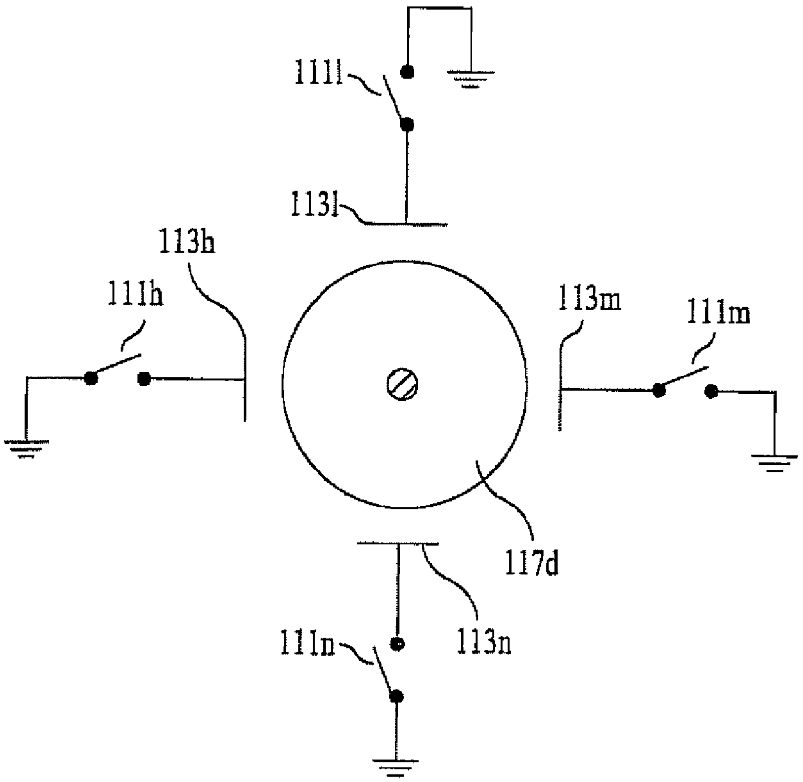
Figure 5E:
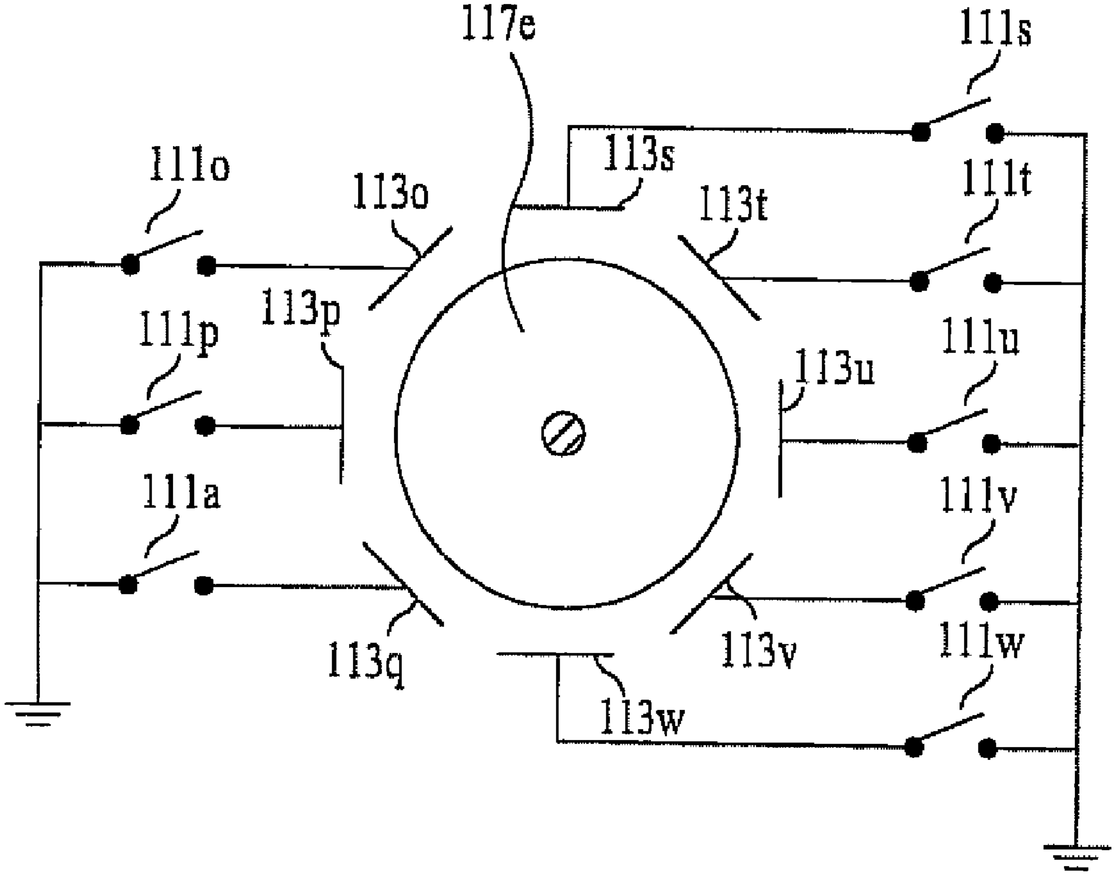

Referring to FIGS. 2-4, illustrating a beam switching antenna system according to one embodiment of the present invention, a monopole element 1 is connected via a power feed connector 8 to a power feed line 2, to have an overall length of λ/4, where λ is the wavelength of the radiating beam in air. The monopole element 1 converts radio frequency energy supplied from the power feed line 2 to a beam having a predetermined pattern radiating in the atmosphere and converts radio frequency energy received from the atmosphere to an electrical signal supplied to the power feed line 2. A plurality of upper and lower conductive reflectors 3*a*-3*d* and 6*a*-6*d*, respectively connected in series, are disposed in opposition to the monopole element 1, and a dielectric body 7 having a plurality of circumferential planar surfaces corresponding to the conductive reflectors 3*a*-3*d* and 6*a*-6*d* is interposed between the monopole element 1 and the conductive reflectors 3*a*-3*d* and 6*a*-6*d*. It is preferably that a dielectric of air additionally occupy a small space between the monopole element 1 and the dielectric body 7 and that a dielectric of another material additionally occupy a small space between the dielectric body 7 and the conductive reflectors 3*a*-3*d* and 6*a*-6*d*. Thus, though not shown precisely to scale, the dielectric thickness substantially establishes a distance of $\lambda_d/4$ between the monopole element 1 and any of the conductive reflectors 3*a*-3*d* and 6*a*-6*d*, where $\lambda_d$ is the wavelength of the radiating beam in the dielectric body 7. According to the preferred configuration of the present invention, each of the plurality of conductive reflectors 3*a*-3*d* and 6*a*-6*d* faces a circumferential planar surface of the dielectric body 7, which surrounds the monopole element 1.

One end of each of the upper conductive reflectors 3*a*-3*d* and the lower conductive reflectors 6*a*-6*d* is electrically connected to one terminal of one of a plurality of ground switches 5*a*-5*d*, which are respectively disposed at the series connections (ends) of the upper and lower conductive reflectors 3*a*-3*d* and 6*a*-6*d*, to construct a ground switch circuit comprising a reference voltage source, i.e., ground, generating a reference voltage; a ground line 4 connected to the reference voltage source; an electrical switching device (described below) connected between the ground line and the conductive reflector; and a controller (see FIG. 8) for controlling the electrical switching device. The other terminal of each of the ground switches 5*a*-5*d* is grounded via the ground line 4, such that the closing of a ground switch and applies the reference voltage and completes the series connection of the upper and lower conductive reflectors 3*a*-3*d* and 6*a*-6*d*. In doing so, the conductive reflector to which the reference voltage is applied via the corresponding closed ground switch reflects the beam to impart it with a radiation pattern having a predetermined directivity. Thus, the monopole element 1 of the beam switching antenna system according to the present invention provides a non-directional beam but, in accordance with the switched status of the ground switches 5*a*-5*d*, selectively applies the non-directional beam to the conductive reflectors 3*a*-3*d* and 6*a*-6*d*, to generate a predetermined beam pattern. Such a beam pattern is one having the desired properties of directivity, width, and gain.

According to the present invention, the resulting radiation pattern is determined by the grounded conductive reflectors and is unaffected by an ungrounded conductive reflector. To minimize the distortion of the radiation pattern caused by unselected reflectors, the length of each of the upper conductive reflectors 3*a*-3*d* is preferably λ/8, the length of each of the lower conductive reflectors 6*a*-6*d* is preferably λ/16, the length of each of the ground switches 5*a*-5*d* is preferably λ/16, and the length of each of the ground lines 4 is preferably λ/4. The thickness of the dielectric body 7 is preferably $\lambda_d/4$ but may be reduced by employing higher dielectric constants or larger surface areas opposing the conductive reflectors 3*a*-3*d* and 6*a*-6*d*, to achieve a slim and compact antenna system advantageous in application to a mobile communication terminal as well as a base station or repeater.

The control method and apparatus of the present invention selectively applies the reference voltage to the selected upper conductive reflectors 3*a*-3*d* via a corresponding ground line 4, lower conductive reflector 6*a*-6*d*, and ground switch 5*a*-5*d*. The ground switches 5*a*-5*d* may be realized by an electrical switching device such as a transistor or diode receiving a control signal from a control circuit, to control a current path between two terminals of the corresponding ground switch. The ground switches 5*a*-5*d* are respectively installed between the upper and lower conductive reflectors 3*a*-3*d* and 6*a*-6*d*, such that assembly of the connections between the ground lines 4 and the lower conductive reflectors 6*a*-6*d* is facilitated.

To match the impedance between the ground lines 4 and the conductive reflectors 3*a*-3*d* and 6*a*-6*d*, a plurality of impedance matching circuits may be respectively provided between the ground lines and the lower conductive reflectors 3*a*-3*d* and 6*a*-6*d*. To minimize loss of radio frequency energy, an impedance matching circuit may be provided between the power feed line 2 and the monopole element 1. The monopole element 1 and the conductive reflectors 3*a*-3*d* and 6*a*-6*d* may be formed of the same metal, such as aluminum.

Referring to FIGS. 5A to 5E, respectively illustrating a beam switching antenna system according to other embodiments of the present invention, a schematic horizontal cross-section of a dielectric body 117*a*~117*e* enclosing the monopole element 1 may be a circle or a regular polygon, with at least two reflectors 113*a*~113*w* symmetrically arranged outside the dielectric body 117*a*~117*e*. Corresponding ground switches 111*a*~111*w* are respectively connected in series to the reflectors 113*a*~113*w*. The structure and control of the monopole element 1, dielectric body 117*a*~117*e*, ground switches 111*a*~111*w*, and reflectors 113*a*~113*w* are equivalent to those described in connection with FIGS. 2-4.

The control of the ground switches according to the present invention results in the non-directivity or directivity of a beam 60 radiating from the monopole element 1 in accordance with an operational state of a mobile communication terminal, as illustrated in FIGS. 6A to 6K in which the ground switches 5*a*-5*d* are controlled by the control method and apparatus according to the present invention.

Figure 6A:
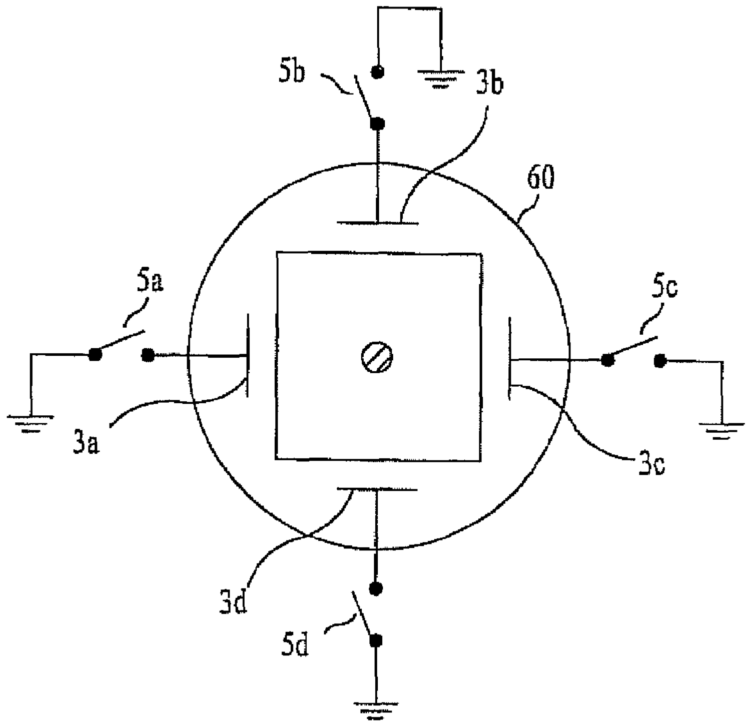
FIGS. 6A to 6K are schematic diagrams of possible beam patterns, which are varied by turning on/off ground switches of a beam antenna switching system according to the present invention.
Figure 6B:
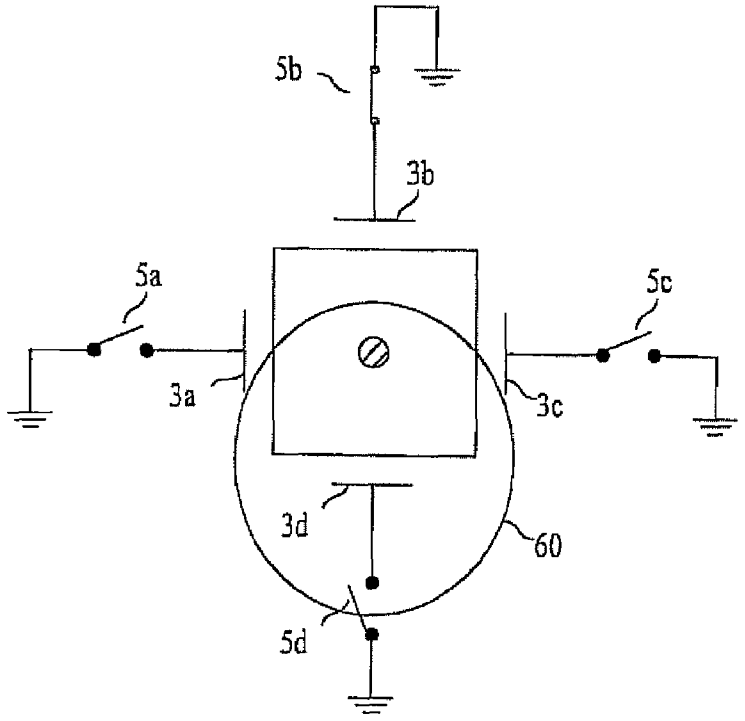
Figure 6C:
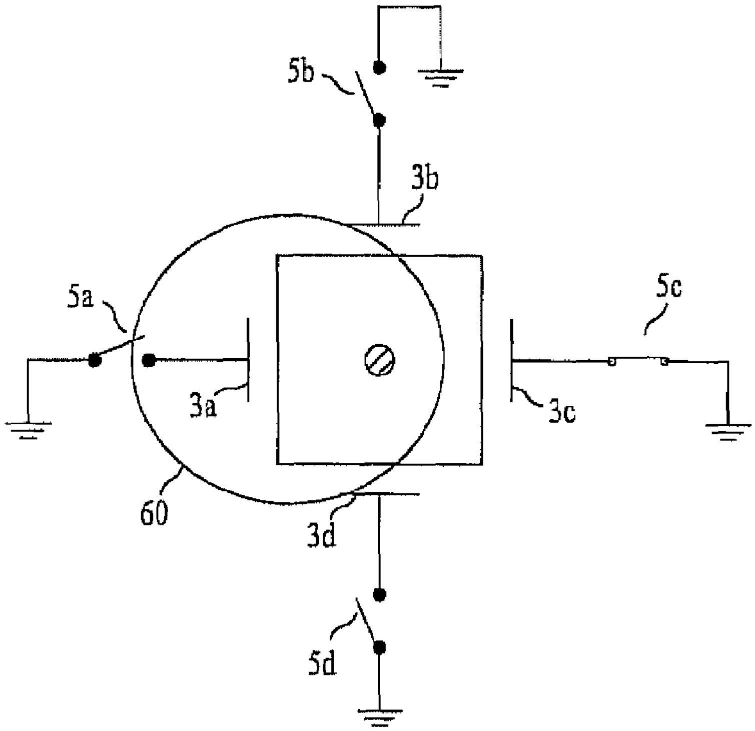
Figure 6D:
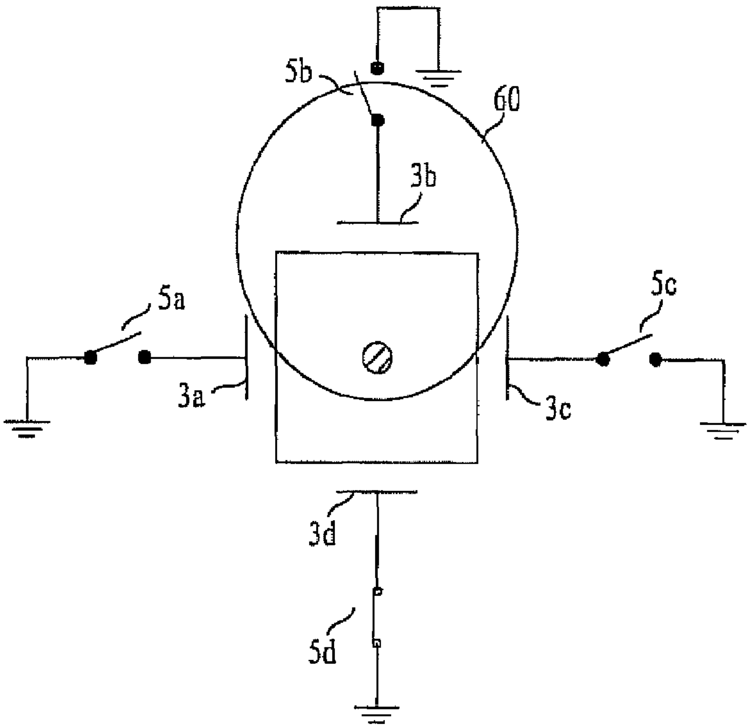

As shown in FIG. 6A where all the ground switches 5*a*-5*d* are open, the beam 60 is non-directionally formed. If at least one of the ground switches 5*a*-5*d*, as shown in FIGS. 6B~6K, is selectively closed to apply the reference voltage to (ground) one or more of the conductive reflectors 3*a*-3*d* and 6*a*-6*d*, a radiation pattern of the beam 60 is reflected on the grounded reflectors to be directed oppositely with respect to the selected reflectors.

Figure 6E:
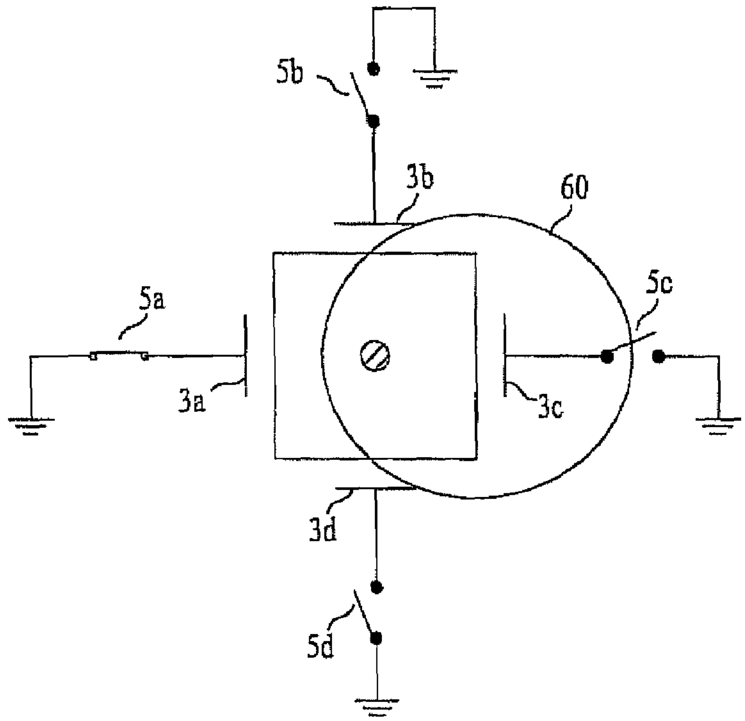
Figure 6F:
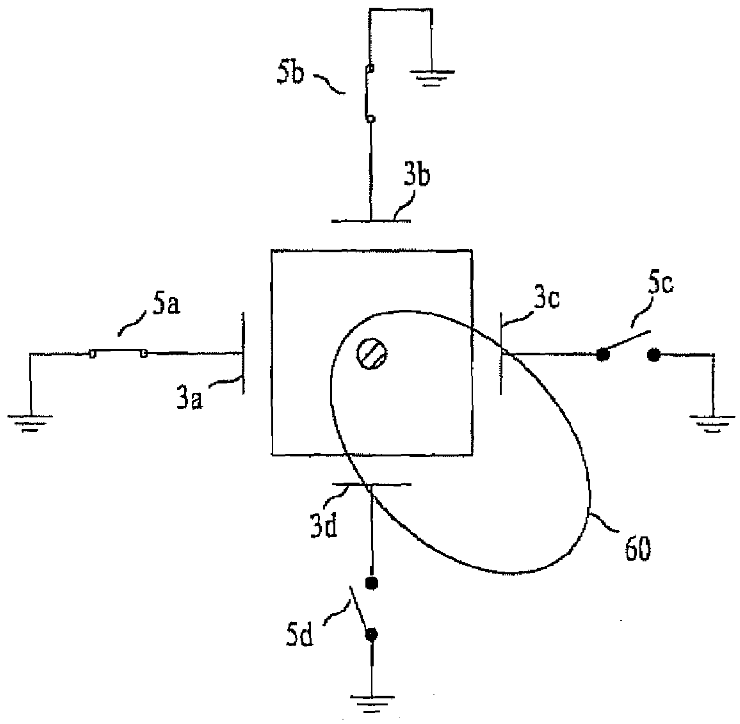
Figure 6G:
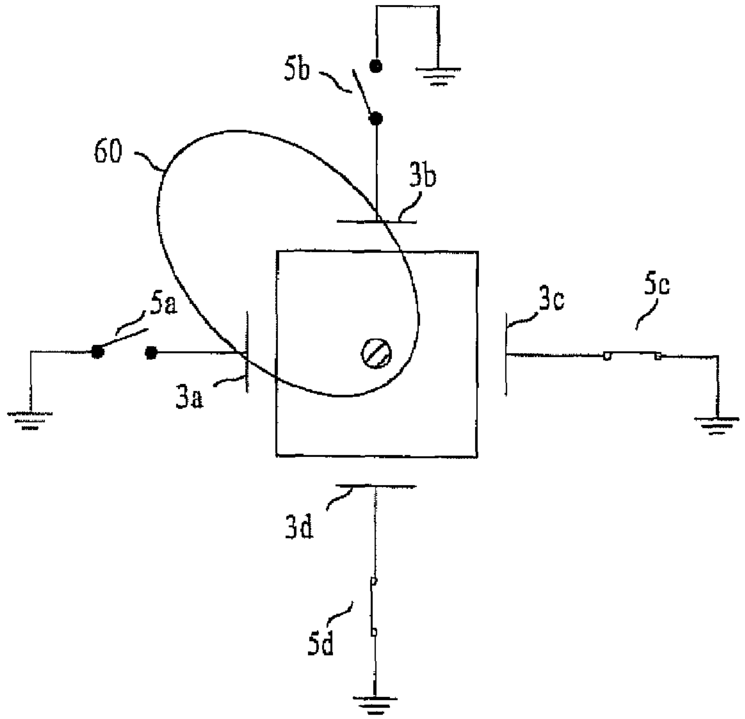
Figure 6H:
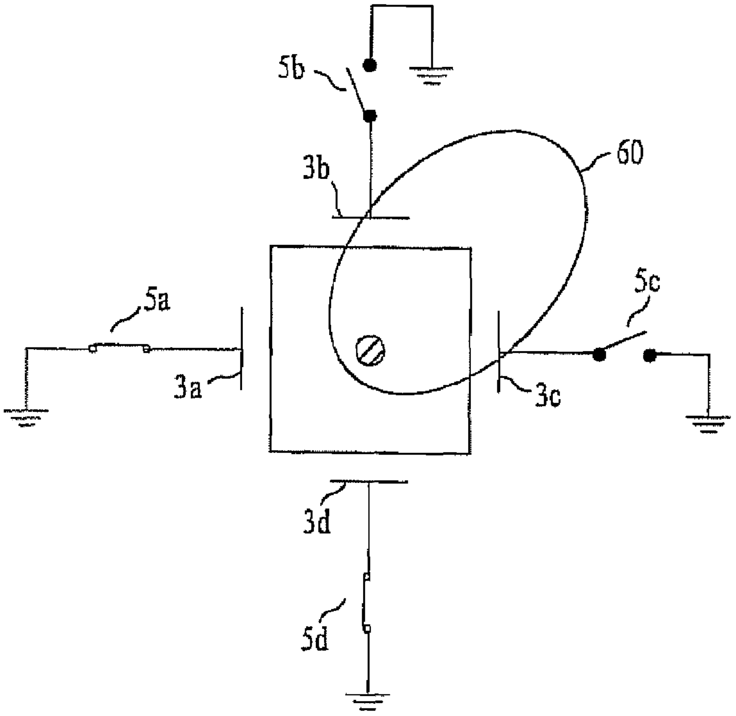
Figure 6I:
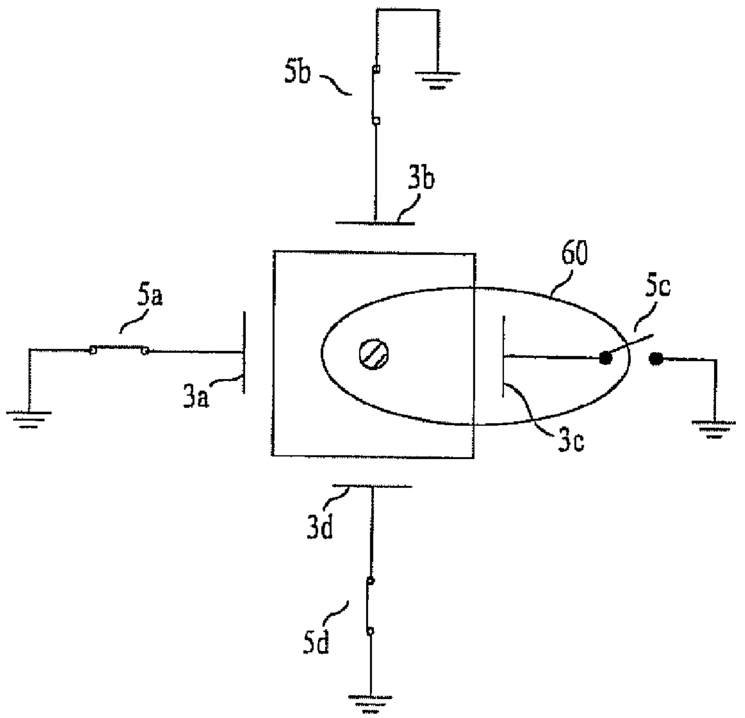
Figure 6J:
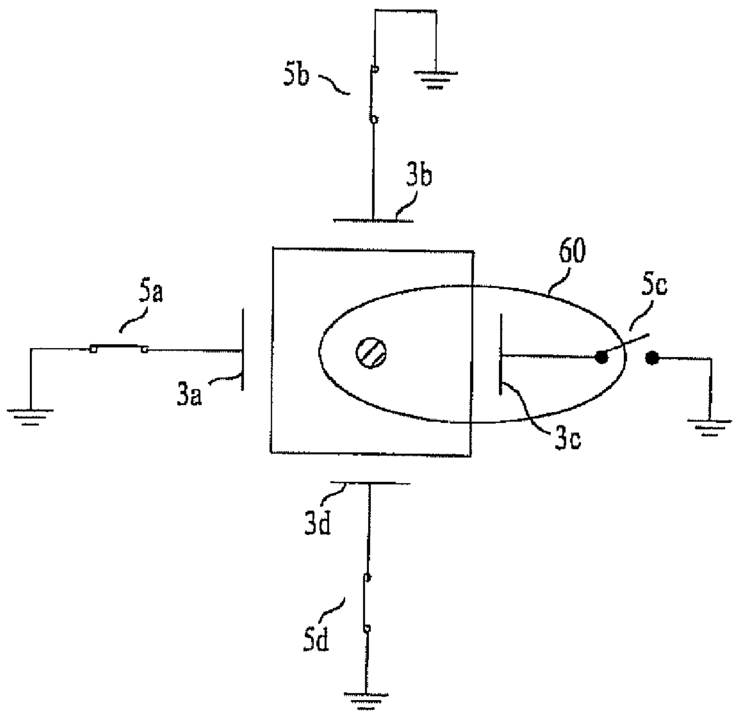
Figure 6K:
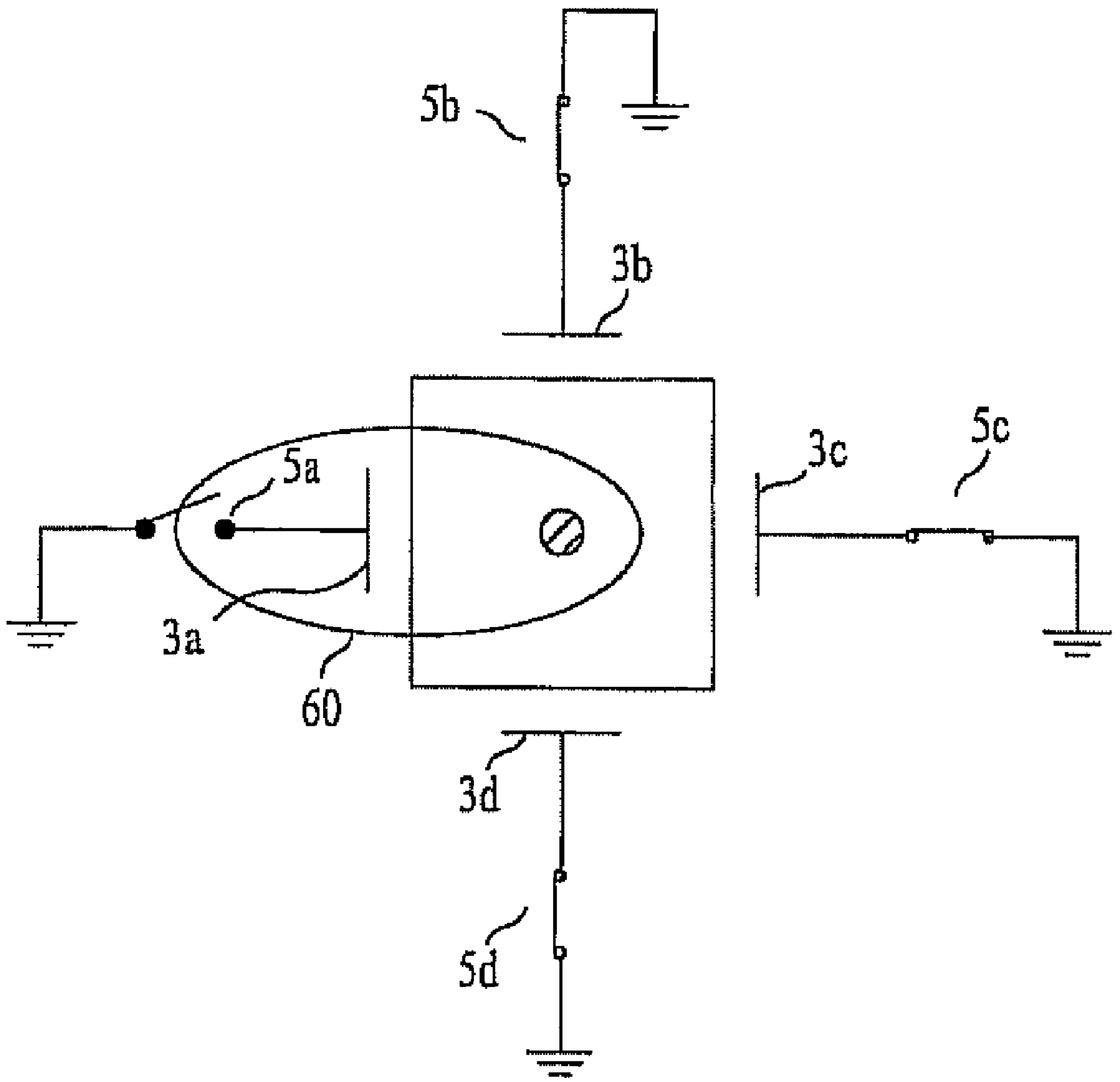

A beam antenna system according to an embodiment of the present invention varies the switching status of the ground switches 5*a*-5*d*, thereby enabling to control the beam's width and amplitude (gain). For instance, as shown in FIG. 6E, the directivity of the beam 60 achieved by closing only the ground switch 5*a* is the same as that achieved in FIG. 6J where the ground switches 5*b* and 5*d* are closed in addition to the ground switch 5*a*. As shown in FIG. 6J, however, the beam width of the beam 60 is narrower and its gain is greater.

Figure 7A:
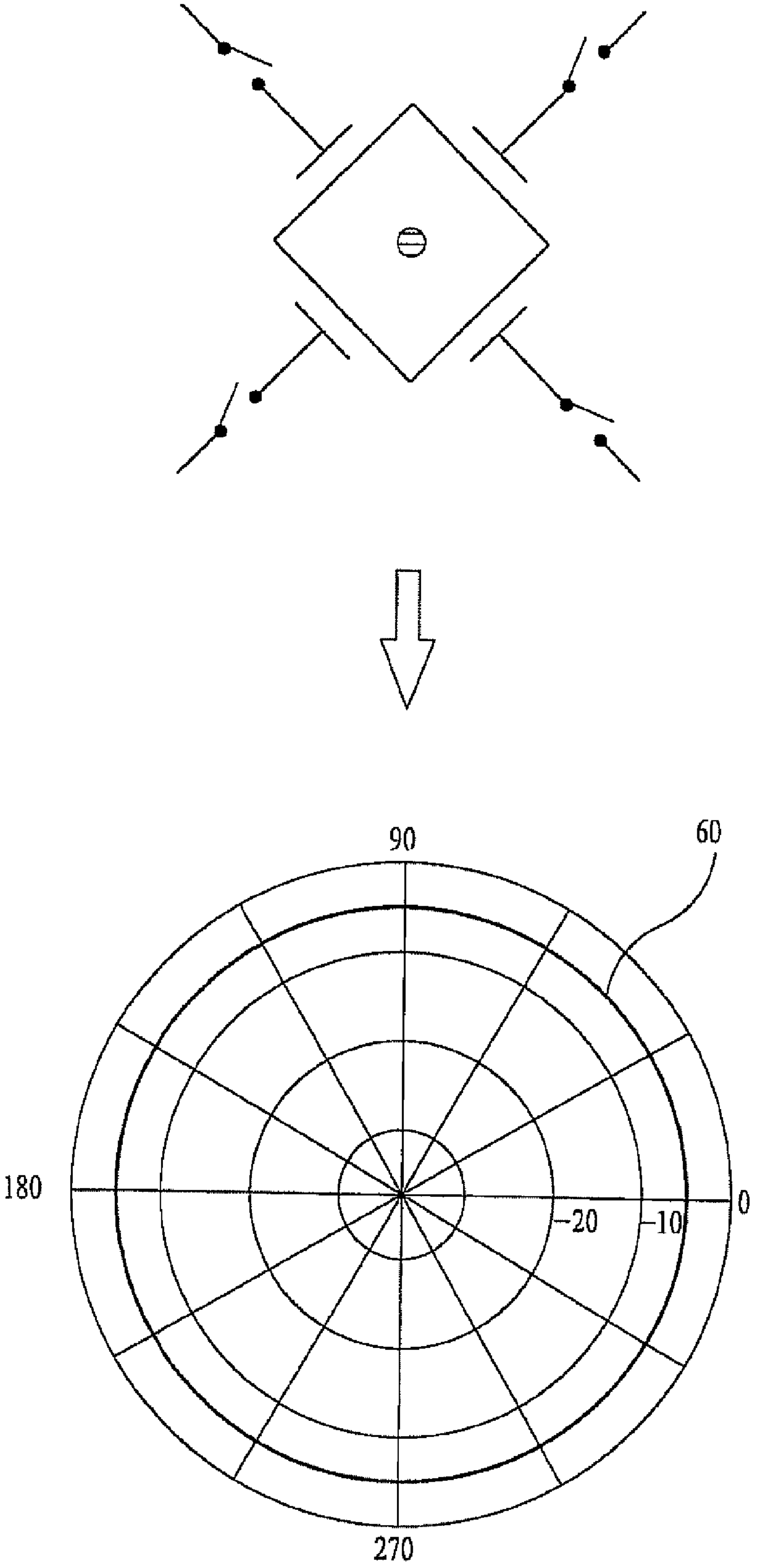
FIGS. 7A to 7C are diagrams of test results of beam patterns in accordance with a corresponding status of ground switches of a beam antenna switching system according to the present invention.
Figure 7B:
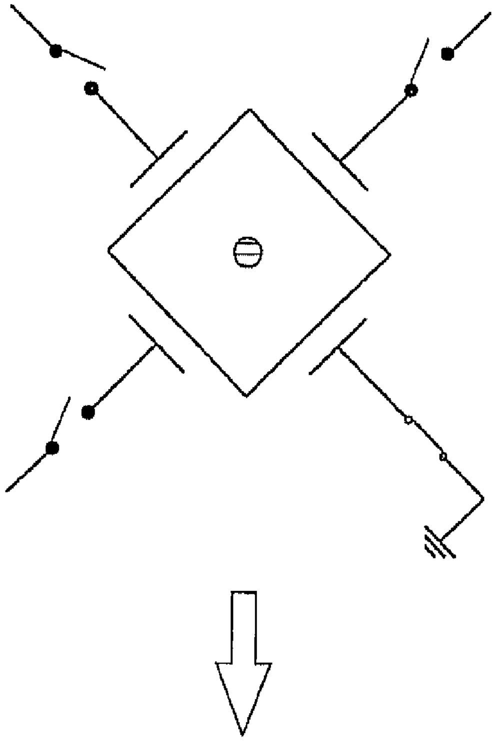
Figure 7B:
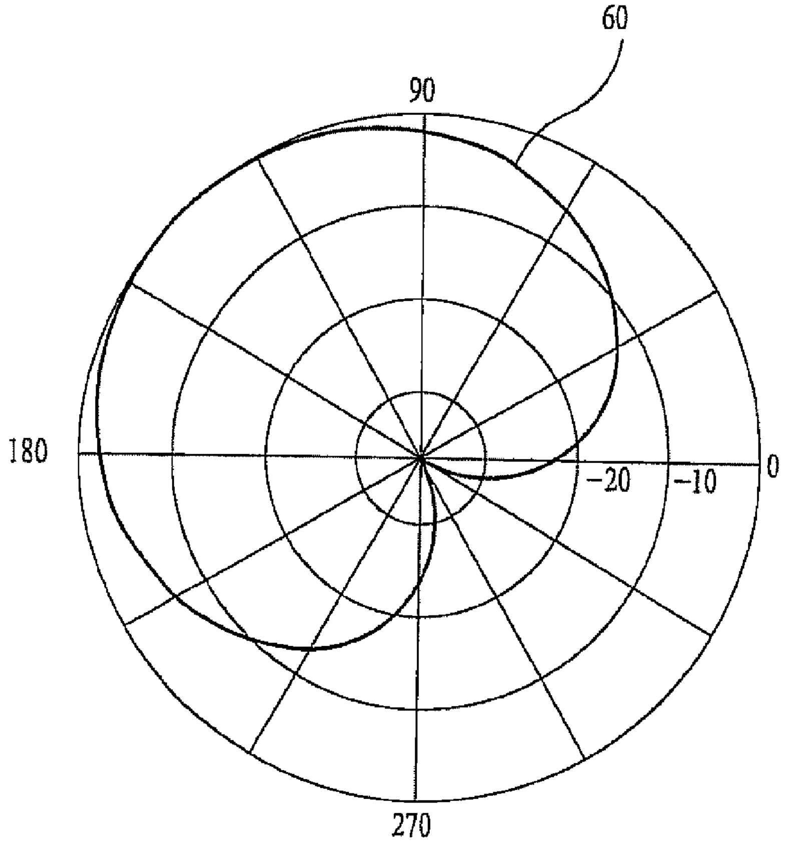
Figure 7C:
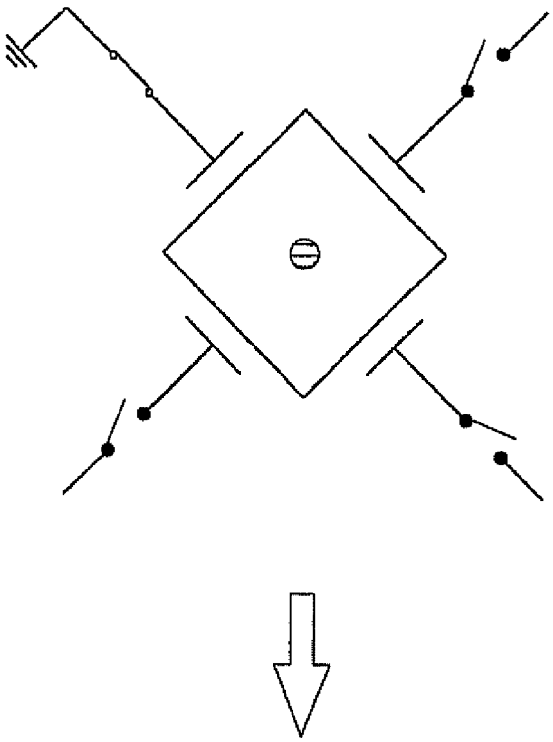
Figure 7C:
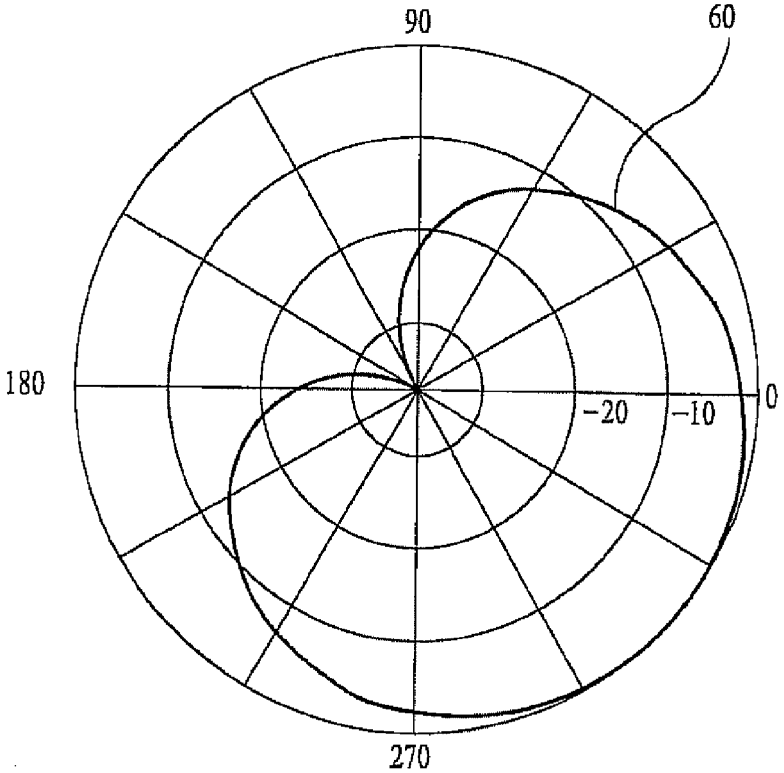

FIGS. 7A-7C respectively illustrate beams resulting from the switched status of the ground switches 5*a*-5*d*. Here, FIG. 7A shows a non-directional beam 60 generated when all the ground switches are open, and FIGS. 7B and 7C show a directional beam 60 generated when one of the ground switches is closed to impart directivity in the opposite direction with respect to the closed switch.

Method and Apparatus for Controlling the Beam Switchinq Antenna System

A method and apparatus for controlling a beam switching antenna system according to preferred embodiments of the present invention will now be explained. In the following embodiments, the beam switching antenna system is applied to a terminal but is equally applicable to a base station. Here, the forming or orienting of a beam is achieved by a configuration of the beam switching antenna system, namely, the selective setting of the ground switches by a controller.

First Embodiment

Figure 8:
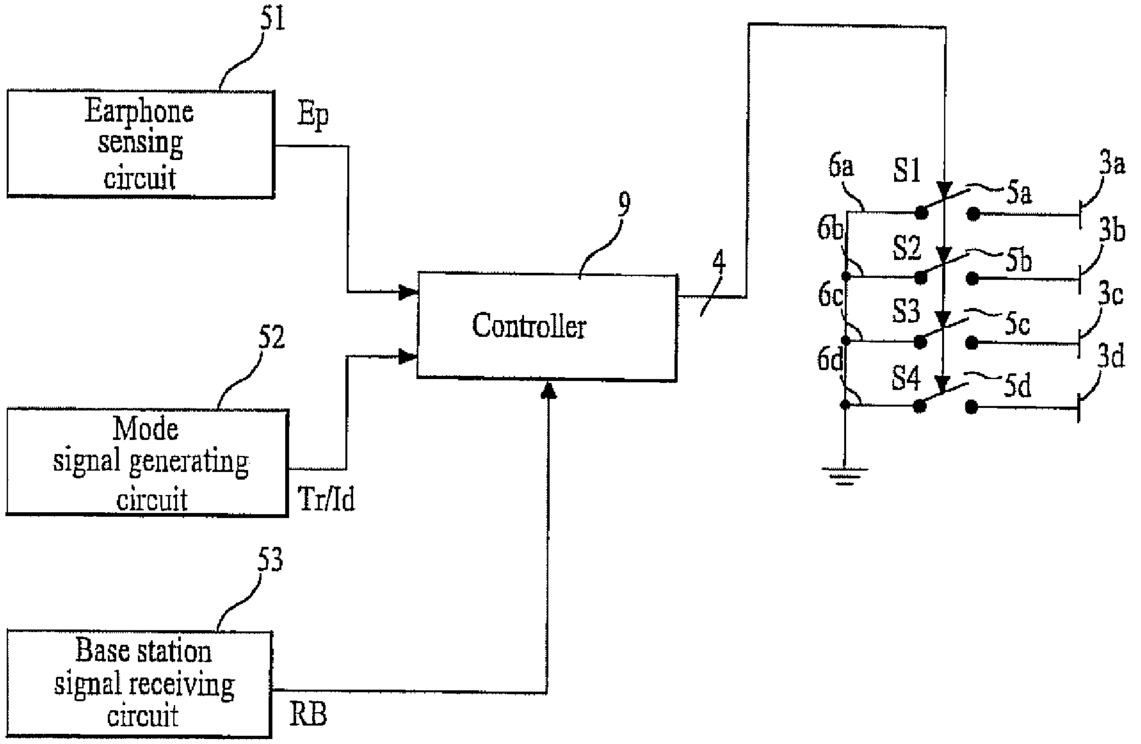
FIG. 8 is a block diagram of an apparatus for controlling the ground switches of a beam switching antenna system according to the present invention.

Referring to FIG. 8, an apparatus for controlling the ground switches of a beam switching antenna system according to the present invention comprises an earphone sensing circuit 51, a mode signal generating circuit 52, a base station signal receiving circuit 53, and a controller 9 which includes the above-described control circuit for generating the control signal for selectively operating the ground switches. When an earphone is connected to a mobile communication terminal, the earphone sensing circuit 51 senses the connection and generates earphone sensing data Ep. The mode signal generating circuit 52 senses the terminal's mode of operation, i.e., whether the mobile communication terminal operates in a traffic mode through a traffic channel established between an originator and a recipient or in an idle mode where the traffic channel is cut off, and then generates traffic/idle mode data Tr/Id indicating the terminal's current mode. The beam formation of the antenna system is determined by the base station signal receiving circuit 53 and controller 9, which generate a directional or non-directional beam based on the signal reception of a forward link signal of a base station signal RB, which is received via the antenna and supplied to the controller. The base station signal RB includes an Ec/Io (energy of carrier/sum of noise) signal as a pilot signal for identification of the base station, a synchronization signal, a paging signal, a traffic channel signal, and the like. The base station signal receiving circuit 53 may be realized by a rake receiver receiving, from all directions, the total power of the base station signal on a given frequency.

Based on the received base station signal RB, the controller 9 generates a plurality of switch control signals S1-S4 for respectively controlling the ground switches 5*a*-5*d* to control the directivity or non-directivity of the beam by applying the switch control signals to control terminals of the ground switches. The controller 9 searches a beam-oriented direction in handoff or traffic service and, to maintain optimal traffic quality, sets up the beam of the antenna in an optimal beam-oriented direction according to the search result.

The generation of the switch control signals S1-S4 may also be based on the earphone sensing data Ep and traffic/idle mode data Tr/Id. An operation of the controller 9 according to the earphone connection state and the traffic/idle mode is explained with reference to FIG. 9, illustrating a method of controlling a beam switching antenna system according to one embodiment of the present invention, and FIG. 10 illustrating a mobile communication terminal 90 having a beam switching antenna system 91 and an earphone 92.

Figure 9:
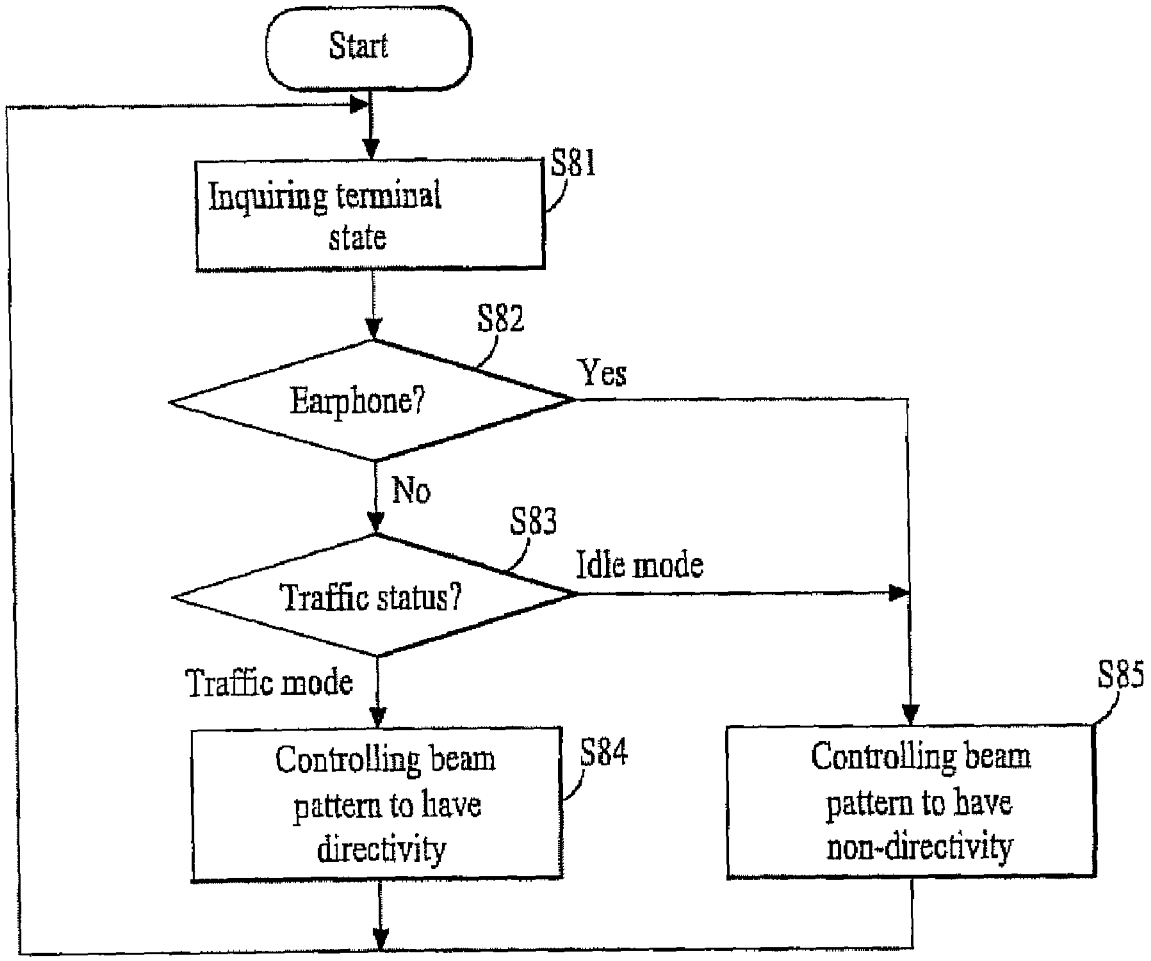
FIG. 9 is a flowchart of a method of controlling a beam switching antenna system according to one embodiment of the present invention.
Figure 10:
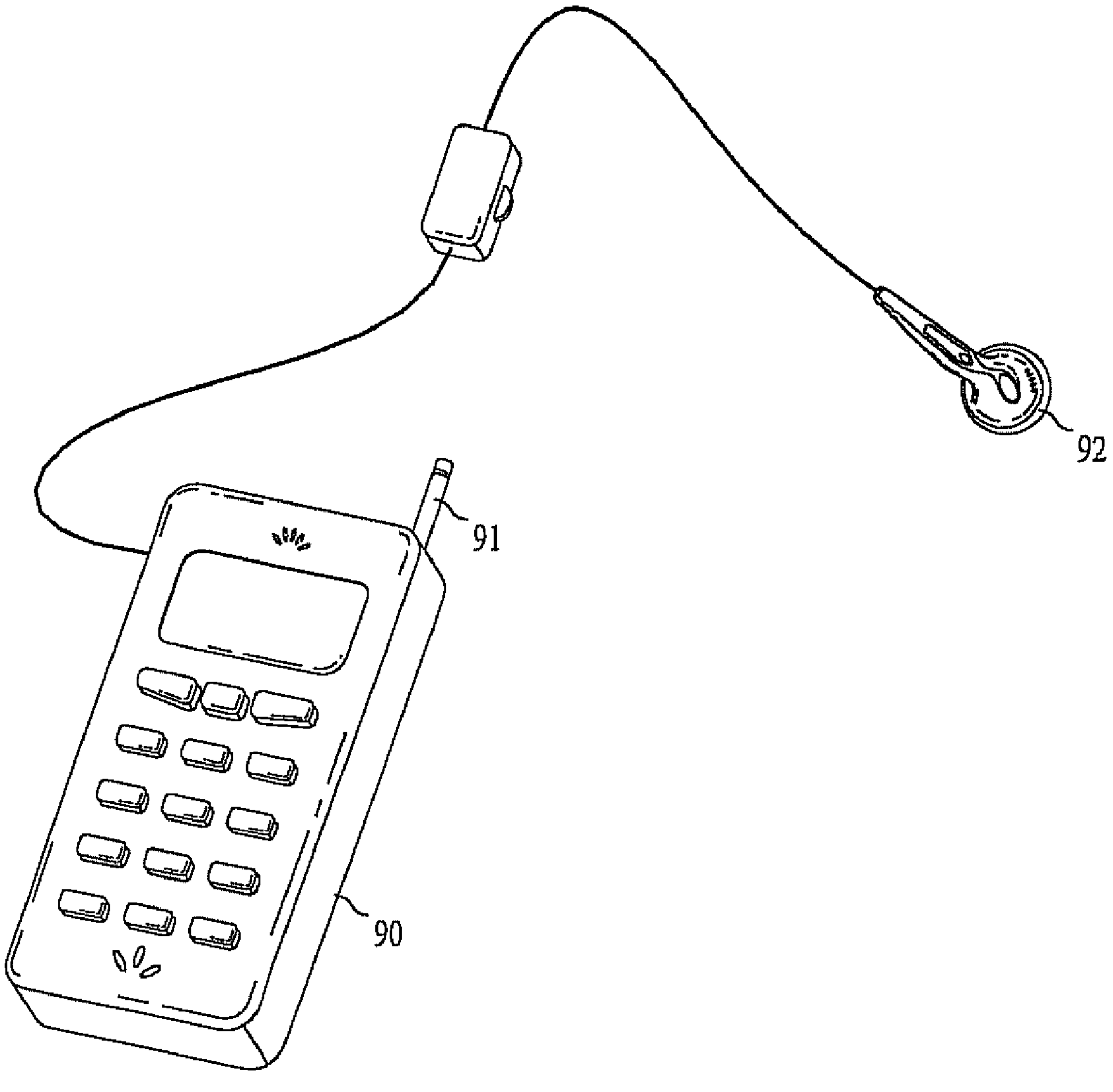
FIG. 10 is a perspective view of a mobile communication terminal having an earphone.

Referring to FIGS. 8-10, the controller 9 determines in a step S81 a current state of the mobile communication terminal 90 by receiving the earphone sensing data Ep from the earphone sensing circuit 51 and the traffic/idle mode data Tr/Id from the mode signal generating circuit 52. If it is determined in a step S82 that the earphone is connected to the mobile communication terminal, the controller 9 opens all the ground switches 5*a*-5*d* to cut off the supply of the reference voltage to the conductive reflectors 3*a*-3*d*. In doing so, the beam 60 is non-directionally controlled in a step S85. That is, when the earphone 92 is connected to the mobile communication terminal 90, it is determined that the earphone is being used such that the beam switching antenna system 91 of the mobile communication terminal is remotely positioned with respect to the user's head. This distance between the mobile communication terminal 90 and the user's head greatly reduces the influence of the electromagnetic waves of the beam, since the intensity of the electromagnetic waves is inversely proportional to the square of the distance. In this case, the beam switching antenna system is configured according to the control method of the present invention so as to control the pattern of the beam 60 to be non-directional, to facilitate the transmission/reception between the mobile communication terminal 90 and a base station regardless of the direction of the base station, On the other hand, if it is determined in the step S82 that the earphone 92 is disconnected but that the mobile communication terminal 90 operates in the idle mode according to the traffic/idle mode data Tr/Id (S83), the controller 9 similarly opens all of the ground switches 5*a*-5*d* to generate a non-directional beam 60, since it is assumed that, in the idle mode, the mobile communication terminal need not be close to the user's ear. In the event that the earphone 92 is disconnected and the mobile communication terminal 90 is operating in the traffic mode, in which case it is determined that the beam switching antenna system 91 of the mobile communication terminal is radiating close to the user's head, the controller 9 selectively closes one or more of the ground switches 5*a*-5*d* to direct the beam 60 away from the user, thereby minimizing the electromagnetic waves of the beam 60 propagate directly toward the user. The direction of the user is assumed by referencing the relative position of the controls, speaker, and microphone of the mobile communication terminal 90 and stored in the controller 9.

By applying the principles of the present invention, it should be appreciated that the plural construction of the conductive reflectors 5*a*-5*d* is unnecessary. For instance, if the controlled radiation pattern is directed in a direction opposite that of the user, i.e., away from the user, only one conductive reflector is needed. If so configured, the conductive reflector would be disposed adjacent the user.

It should be further appreciated that the above-described control method and apparatus of the beam switching antenna according to the present invention are applicable to any antenna system enabling a beam switching. For instance, the control method and apparatus according to the present invention are applicable to an antenna system differentiating phases of signals supplied to a plurality of antenna elements to give directivity to a beam generated from combining a plurality of beams having various angles formed by the antenna elements, respectively.

Second Embodiment

Figure 11:
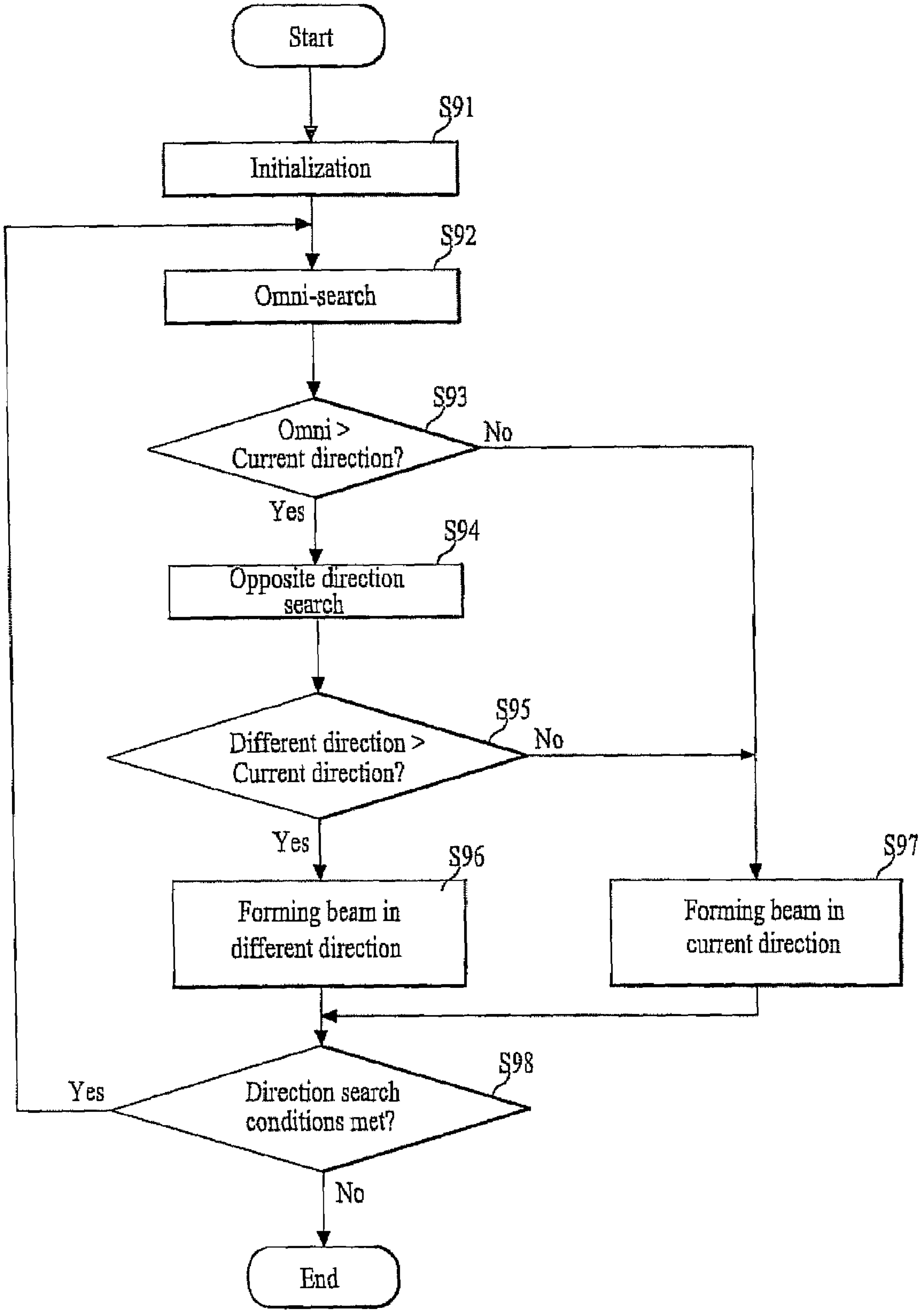
FIG. 11 is a flowchart of a method of controlling a beam switching antenna system according to another embodiment of the present invention.
Figure 12A:
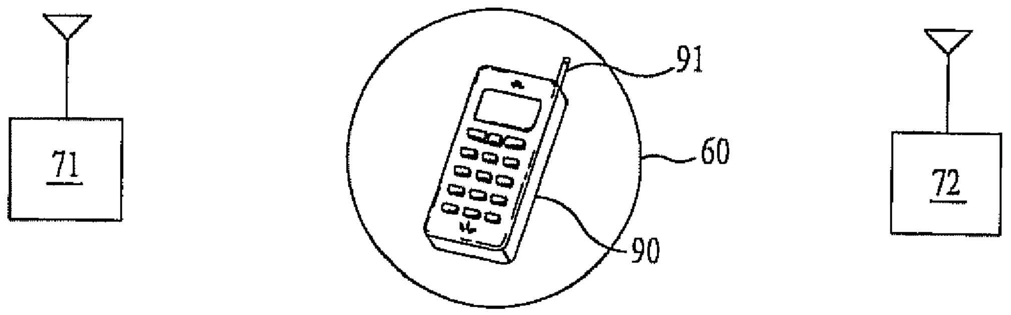
FIG. 12A is a diagram of a non-directional beam pattern on searching a beam-oriented direction.
Figure 12B:
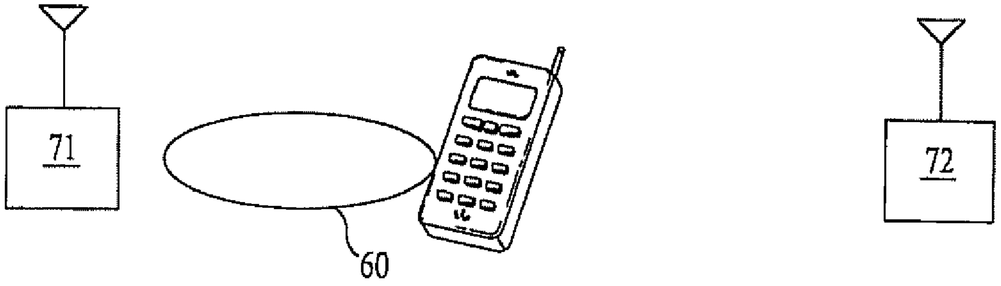
FIG. 12B is a diagram of a beam pattern oriented in a first direction on searching a beam-oriented direction.
Figure 12C:
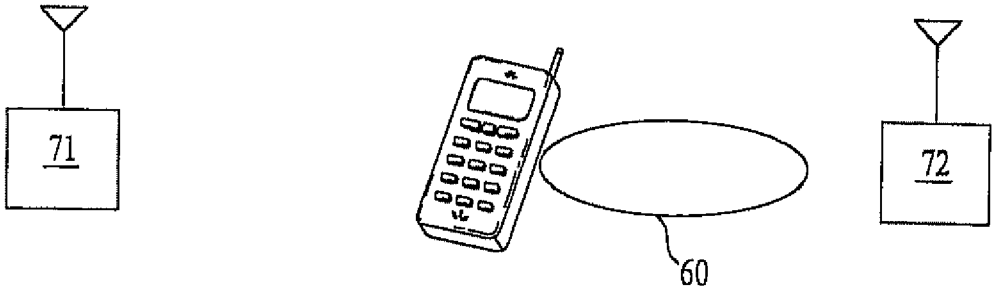
FIG. 12C is a diagram of a beam pattern oriented in a second direction on searching a beam-oriented direction.

FIG. 11 illustrates a method of controlling a beam switching antenna system according to another embodiment of the present invention, using the apparatus of FIG. 8, which is explained together with FIGS. 12A-12C in which first and second base stations 71 and 72 are shown.

Referring to FIG. 11, an initialization procedure is executed in a step S91, for receiving base station signals RB transmitted from the base stations 71 and 72 on a forward link via the beam switching antenna system 91 installed at the mobile communication terminal 90 and for synchronizing the mobile communication terminal and base stations. The controller 9 then controls in a step S92 the ground switches 5*a*-5*d* in an omni-directional mode to form a non-directional beam 60 as shown in FIG. 12A. In doing so, the beam switching antenna system 91 of the mobile communication terminal 90 receives all signals transmitted from the first and second base stations 71 and 72. After receiving the base station signals RB from all directions, i.e., in the omni-directional mode using the non-directional beam 60, the controller 9 immediately detects reception properties of the received base station signal RB, namely, its intensity and its error rate, and stores the detected information in a memory in the mobile communication terminal 90. The stored information is compared in a step S93 to that of the base station signal RB received in forming the beam in a current direction. In this case, the current direction is a direction of a beam formed before the initialization and may be a direction of the non-directional beam or a direction of a beam oriented to a specific direction. The intensity or error rate of the base station signal RB received in forming the beam in the current direction is measured before the initialization step to that the corresponding value is stored in the memory of the mobile communication terminal 90 for a predetermined time period.

In the description of the subsequent steps, the current direction is assumed to be a first direction, as shown in FIG. 12B, where the beam 60 is directed toward the first base station 71.

If in the step S93 the intensity of the base station signal RB received in forming the non-directional beam is greater than that received in forming the beam in the current direction, i.e., the first direction, or if the error rate of the base station signal RB received in forming the non-directional beam is lower than that received in forming the beam in the first direction, the controller 9 controls in a step S94 the ground switches 5*a*-5*d* to form a beam in a different direction to receive the base station signal RB. In this case, the different direction is assumed to be a second direction where the beam 60, as shown in FIG. 12C, is directed to the second base station 72.

If in the step S93 the intensity of the base station signal RB received in forming the non-directional beam is not greater that that received in forming the beam in the first direction, or if the error rate of the base station signal RB received in forming the non-directional beam is not lower than that received in forming the beam in the first direction, the controller 9 orients in a step S97 the beam in the current (first) direction. In this case the first direction, i.e., the current direction, is an optimal beam-oriented direction.

In the step S94, the controller 9 measures the intensity and error rate of the base station signal RB received when the beam is formed in the second direction and then compares in a step S95 the intensity or error rate of the base station signal RB measured in the second direction to that measured in the current direction, i.e., the first direction.

If in the step S95 the intensity of the base station signal RB received in forming the beam in the second direction is greater than that received in forming the beam in the first direction, or if the error rate of the base station signal RB received in forming the beam in the second direction is lower than that received in forming the beam in the first direction, the controller 9 controls in a step S96 the ground switches 5*a*-5*d* to form a beam in the second direction. In this case, the second direction as a different direction is an optimal beam-oriented direction.

If in the step S95 the intensity of the base station signal RB received in forming the beam in the second direction is not greater than that received in forming the beam in the first direction, or if the error rate of the base station signal RB received in forming the beam in the second direction is not lower than that received in forming the beam in the first direction, the controller 9 controls in the step S97 the ground switches 5*a*-5*d* to form a beam in the first direction. In this case, the controller 9 forms an omni-directional beam, i.e., a non-directional beam, by controlling the ground switches 5*a*-5*d* in case of handoff or the like. The first direction or the omni-direction in the step S97 is an optimal beam-oriented direction.

After completion of the step S96 or S97, the controller 9 determines in a step S98 whether direction search conditions are met. The direction search conditions include a reception power level and a predetermined search time, e.g., an idle mode or a dormant period. The search may be performed periodically, say, every five seconds, enabling a search even if the mobile communication terminal 90 operates in the traffic mode. If the direction search conditions are met, i.e., if the search time occurs or if the reception power level of the received base station signal RB is below a predetermined reference level, the controller 9 re-executes the steps S92 to S97 as a predetermined search cycle.

Thus, the control method of the beam switching antenna system according to the present invention forms the beam 60 of the non-directivity to compare the intensity or error rate of the received base station signal to that of the current direction. As a result of the comparison, if the intensity of the reception signal in the omni-direction is equal to or smaller than that in the current direction or if the error rate in the omni-direction is equal to or higher than that in the current direction, the current direction is set as the optimal direction to skip the unnecessary search time so that the search time and the power consumption for the search are reduced. Moreover, the control method of the beam switching antenna system according to the present invention sets the optimal beam-oriented direction with the minimum search time, thereby enabling to optimally maintain the traffic quality at all times when the mobile communication terminal operates in the traffic mode.

Figure 13:
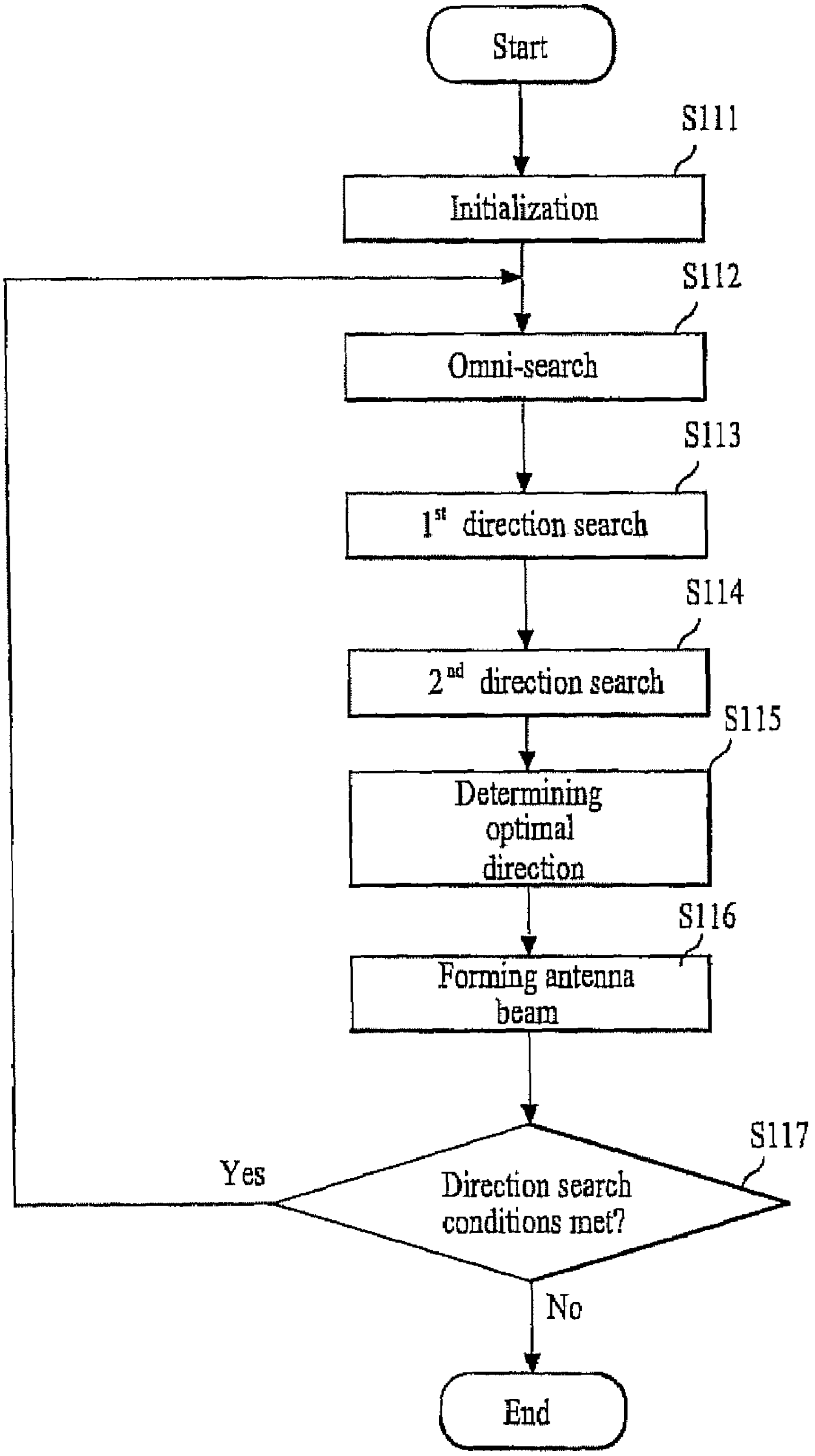
FIG. 13 is a flowchart of a method of controlling a beam switching antenna system according to a further embodiment of the present invention.

FIG. 13 illustrates a method of controlling a beam switching antenna system according to a further embodiment of the present invention, which is explained with reference to FIGS. 12A-12C.

Referring to FIG. 13, an initialization procedure is executed in a step S111, for receiving base station signals RB transmitted from the base stations 71 and 72 on a forward link via the beam switching antenna system 91 installed at the mobile communication terminal 90 and for synchronizing the mobile communication terminal and the base stations.

The controller 9 then controls in a step S112 the ground switches 5*a*-5*d* in omni-mode to form a non-directional beam 60 as shown in FIG. 12A. In doing so, the beam switching antenna system 91 of the mobile communication terminal 90 receives all signals transmitted from the first and second base stations 71 and 72. Thus, after receiving the base station signals RB in omni-directions with the non-directional beam 60, the controller 9 measures the intensity of the received base station signal RB and the error rate and then stores the measured intensity and error rate of the base station signal RB.

After receiving the base station signals RB by operation in omni-mode, the controller 9 controls in steps S113 and S114 the ground switches 5*a*-5*d* to first form the beam oriented in the first direction, as shown in FIG. 12B, and in then to form the beam oriented in the second direction, as shown in FIG. 12C, to continuously receive the base station signals RB from the base stations 71 and 72 in the different directions. Meanwhile, the controller 9 detects the intensity and error rate of the base station signal RB received in the first direction and the intensity and error rate of the base station signal RB received in the second direction and stores the detected results.

Once the base station signals RB are received in the omni-direction, the first direction, and the second direction and the intensities and error rates of the received base station signals RB are measured, the controller 9 compares the intensities and error rates of the received signals RB in the respective directions to each other to set up the optimal beam direction in a step S115 and then forms in a step S116 the beam 60 in the optimal beam direction. Namely, the controller 9 forms the beam 60 in the direction showing the best reception properties, i.e., the direction showing the greatest intensity of the reception power or the smallest error rate, among the base station signals RB received in the omni-direction, the first direction, and the second direction.

After completion of the steps S115 and S116, the controller 9 determines in a step S117 whether direction search conditions are met. The direction search conditions include a reception power level and a predetermined search time, e.g., an idle mode or a dormant period. The search may be performed periodically, say, every five seconds, enabling a search even if the mobile communication terminal 90 operates in the traffic mode. If the direction search conditions are met, i.e., if the search time occurs or if the reception power level of the received base station signal RB is below a predetermined reference level, the controller 9 re-executes the steps S112 to S116 as a predetermined search cycle.

Accordingly, in the beam switching antenna system and method and apparatus for controlling the same according to the present invention, the non-directional and directional beams are compared to each other in searching the optimal beam-oriented direction, and the search for the unnecessary angles is skipped according to the comparison result. Therefore, the present invention minimizes the search time and reduces the power consumption thereof. The present invention controls the beam into directivity or non-directivity according to a peripheral environment, thereby enabling to secure the optimal antenna characteristics and radio wave service environment according to the peripheral environment. Moreover, the present invention directs the beam away from the mobile communication terminal user, thereby enabling to minimize the electromagnetic waves of the beam directed toward the user's head.

It will be apparent to those skilled in the art that various modifications and variations can be made in the present invention without departing from the spirit or scope of the invention. Thus, it is intended that the present invention cover such modifications and variations, provided they come within the scope of the appended claims and their equivalents.

What is claimed is:

1. A method for controlling a beam switching antenna system of a mobile communication terminal, the method comprising:

forming a beam from a monopole antenna element;

determining whether an earphone is connected to the mobile communication terminal; and controlling the formed beam from the monopole antenna element to have non-directivity if it is determined that the earphone is connected to the mobile communication terminal, and controlling the beam from the monopole antenna element to have directivity if it is determined that the earphone is not connected to the mobile communication terminal.

2. The method of claim 1, further comprising:

determining an operation mode of the mobile communication terminal; and controlling the beam to have non-directivity if it is determined that the earphone is not connected to the mobile communication terminal and that the mobile communication terminal operates in an idle.

3. The method of claim 1, wherein, if the beam is controlled to have directivity, the beam is directed away from a user of the mobile communication terminal.

4. The method of claim 1, wherein the directivity of the beam formed from the monopole antenna element is controlled by reflecting the beam using at least one reflector.

5. An apparatus for controlling a beam switching antenna system including a monopole antenna element for forming a beam, at least one conductive reflector for reflecting the beam, and a ground switch for applying a reference voltage to the at least one conductive reflector, the apparatus comprising:

a signal source for supplying the monopole antenna element with a signal to form the beam;

a controller for controlling the ground switch to apply the reference voltage to the at least one conductive reflector, thereby imparting the formed beam with a predetermined beam pattern;

an earphone sensing circuit for determining whether an earphone is connected to the mobile communication terminal; and a mode signal generating circuit for determining an operation mode of the mobile communication terminal, wherein said controller controls the beam from the monopole antenna element to have non-directivity if it is determined that the earphone is connected to the mobile communication terminal and controls the beam from the monopole antenna element to have directivity if it is determined that the earphone is not connected to the mobile communication terminal.

6. The apparatus of claim 5, wherein the beam switching antenna system is installed in a mobile communication terminal.

7. The apparatus of claim 5, wherein said controller controls the beam to have non-directivity if it is determined that the earphone is not connected to the mobile communication terminal and that the mobile communication terminal operates in an idle mode.

8. The apparatus of claim 5, wherein, if said controller controls the beam to have directivity, the beam is directed away from a user of the mobile communication terminal.

* * * * *